United States Patent [19]
Glass et al.

[11] 3,788,769
[45] Jan. 29, 1974

[54] COMBINED AIR AND HYDRAULIC FLUID SUPPLY APPARATUS AND CONTROL THEREFOR

[75] Inventors: William H. Glass; Robert J. Bridigum, both of Pittsburgh, Pa.

[73] Assignee: Westinghouse Air Brake Company, Wilmerding, Pa.

[22] Filed: June 23, 1972

[21] Appl. No.: 265,618

[52] U.S. Cl. ............................................. 417/26
[51] Int. Cl. ........................................... F04b 49/00
[58] Field of Search.......... 417/17, 26, 28, 286–288, 417/426, 428

[56] References Cited
UNITED STATES PATENTS

| | | | |
|---|---|---|---|
| 1,535,856 | 4/1925 | Rix | 417/286 X |
| 2,612,838 | 10/1952 | Nichols | 417/288 X |
| 2,159,781 | 5/1939 | Craig | 417/17 X |
| 1,947,712 | 2/1934 | Grosswege | 417/17 X |
| 2,070,004 | 2/1937 | Davis | 417/17 X |
| 2,921,732 | 1/1960 | De Vin | 417/288 X |

*Primary Examiner*—William L. Freeh
*Attorney, Agent, or Firm*—Ralph W. McIntire, Jr. et al.

[57] ABSTRACT

Combined compressed air and hydraulic fluid supply apparatus including an air compressor and a hydraulic pump driven by common driving means, such as an electric motor. A single electrical circuit for the motor is opened or closed by a pair of switch devices interposed therein in parallel relation, said switch devices being operable to open or close the motor circuit in accordance with the demand of compressed air and/or hydraulic fluid, respectively.

1 Claim, 1 Drawing Figure

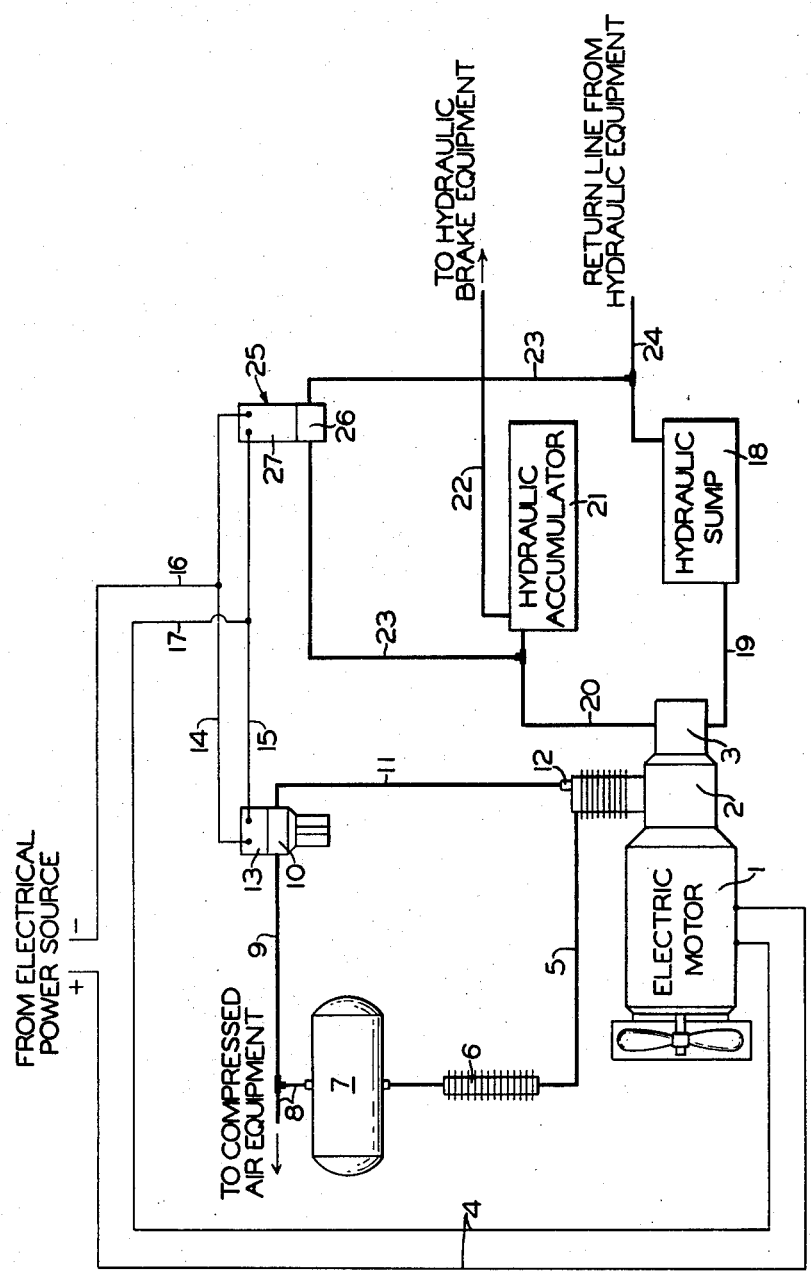

3,788,769

COMBINED AIR AND HYDRAULIC FLUID SUPPLY APPARATUS AND CONTROL THEREFOR

BACKGROUND OF THE INVENTION

In certain instances, such as on rapid transit railway vehicles, for example, it is proposed that a hydraulic brake system be employed with compressed air control therefor. Hydraulic brake equipment, as is well known, is less bulky and, therefore, requires less space than required for truck mounted compressed air brake units. In that the propulsion units are also mounted on the vehicle trucks for direct gear drive, available space for the brake units has become critical. By use of hydraulic brake units, with the compressed air control equipment therefor mounted elsewhere on the vehicle, the problem of space availability is greatly reduced. A combined hydraulic and compressed air brake system does require respective sources of compressed hydraulic fluid and compressed air, the compressed air also being used for other accessories such as operating cylinders for the vehicle doors and for the vehicle air horns, for example.

In that neither the compressed air equipment nor the hydraulic equipment of the type above described is called upon to operate at frequent sustained intervals of time, and since, in the proposed arrangement, the hydraulic portion would take over most of the braking function normally carried out by the compressed air equipment in a conventional braking system, it is feasible to use a common motor for driving both the air compressor and the hydraulic pump through a common shaft in a combined compressed air and hydraulic system.

SUMMARY OF THE INVENTION

The primary object of the present invention is to provide compact hydraulic fluid and compressed air supply apparatus for a combined air and hydraulic system, said apparatus utilizing common driving means for both the air compressor and the hydraulic pump with means for activating the driving means, if one or both of the air and hydraulic portions are calling for supply of operating air or fluid, or for shutting off the driving means when both supply demands are satisfied.

Basically, the invention comprises an air compressor and a hydraulic pump driven by a common shaft connected to a single suitable driving means such as an electric motor to supply, on demand, compressed air and hydraulic fluid for a combined compressed air and hydraulic fluid system such as a combined air-hydraulic brake system for rapid transit railway vehicles. Each of the compressed air and hydraulic portions of the system includes respective fluid pressure operable electrical switch means operable independently of each other but connected in parallel to the energizing circuit of the electric motor so that if one or the other or both of the compressed air and hydraulic portions are calling for operating pressure of air or fluid, one or both of the switches are closed to activate the motor. When neither of the air or hydraulic portions is calling for operating pressure, both switches remain open to effect shut-off of the electric motor. During such time that the electric motor is running to satisfy the demand for operating pressure from only one of the air and hydraulic portions, the uncalled-for pressure is dissipated in conventional manner via the unloader valve in the air compressor or via a bypass circuit in the hydraulic portion, depending upon which of the two portions is calling for the operating pressure.

The single FIGURE drawing is a schematic representation of a combined compressed air and hydraulic fluid supply system embodying the invention.

DESCRIPTION AND OPERATION

The apparatus, as shown in the drawing and embodying the invention, comprises driving means such as an electric motor 1 for driving a common shaft (not shown) by which an air compressor 2 and a hydraulic pump 3 are operated. An electrical circuit 4 is connected to a source of electrical energy (not shown) and, when closed, effects activation of motor 1.

The compressed air portion of the apparatus embodying the invention, in addition to the compressor 2, comprises a conduit or pipe 5 having an after-cooler 6 interposed therein via which compressed air from the compressor is delivered to a storage reservoir 7 whence such compressed air is dispensed via a conduit or pipe 8 to compressed air equipment of the apparatus. Pipe 8 and therefore reservoir 7 are connected via a conduit or pipe 9 to a governor device 10 which, in turn, is connected via a conduit or pipe 11 to an unloader valve device 12 of the compressor 2. The governor device 10 cooperates in conventional manner with the unloader device 12 to control operation of compressor 2 for regulating and maintaining compressed air in reservoir 7 at a pressure within a predetermined range between minimum and maximum air pressures at which the governor device, in well known manner, is pre-set to operate.

According to the invention, a pressure responsive switch 13 is attached to the governor device 10 and is connected by conductors 14 and 15 to conductors 16 and 17, respectively, comprising the motor circuit 4. Switch 13 normally occupies a closed position in which circuit 4 is thereby closed for activating motor 1. When governor device 10, in well known manner, responds to maximum pressure in reservoir 7 for effecting operation of unloader valve device 12 to a cut-off position in which compressed air output of compressor 2 is diverted to atmosphere, such maximum pressure is also diverted to pressure switch device 13, which is pre-set to respond to said maximum pressure also, for effecting operation of the switch device to an open position in which circuit 4 is opened and motor 1 normally is shut down, but not necessarily as will hereinafter be explained.

The hydraulic portion of the apparatus embodying the invention, in addition to the hydraulic pump 3 also comprises a sump 18 connected to the inlet side of said pump via a conduit or pipe 19 wherefrom hydraulic fluid is pumped, via a conduit or pipe 20 connected to the outlet side of said pump, to a hydraulic accumulator 21 whence such fluid is delivered via a conduit or pipe 22 to the hydraulic brake equipment (not shown).

In accordance with the invention and for the purpose of regulating hydraulic pressure in accumulator 21, a bypass hydraulic circuit comprising a conduit or pipe 23 is connected at one end to pipe 20 ahead of accumulator 21 and at the other end to a return conduit or pipe 24 via which hydraulic fluid is returned from the hydraulic equipment to sump 18. A combination valve-switch device 25 is interposed in hydraulic bypass circuit 23 and comprises a valve device 26 and an electric switch device 27. The electric switch device 27 is connected to conductors 16 and 17 via conductors 14 and 15, respectively, in parallel relation to switch device 13. Both the switch device 27 and the valve device 26 normally occupy respective closed positions in which motor circuit 4 is closed and communication through pipe 23 is closed. When hydraulic pressure in accumulator 21 and therefore in pipe 23, by action of pump 3, attains a predetermined maximum degree, valve device 26, which is pre-set to respond to said maximum degree, operates to an open position in which communication through pipe 23 is open to allow hydraulic fluid from pump 3 to bypass the accumulator 21 and return to sump 18. Electric switch device 27, which is also pre-set to respond to the predetermined maximum degree of hydraulic pressure, operates in response thereto to an open position in which motor circuit 4 is opened provided switch device 13 is not closed, as will be presently described.

In operation, assuming that the pressure state of both the compressed air storage reservoir 7 and the hydraulic accumulator 21 is below the respective maximum pressures so that both switch devices 13 and 27, and therefore motor circuit 4, are all closed, and motor 1 is running. Both air compressor 2 and hydraulic pump 3 are operating to build up air and hydraulic pressure in reservoir 7 and accumulator 21, respectively, to the maximum degree. Assuming, for example, that accumulator 21 attains a state of maximum pressure first, such maximum pressure, as above noted effects opening of valve device 26 for opening hydraulic bypass 23. Switch device 27 is also opened, but since switch device 13 remains closed, motor circuit 4 also remains closed and motor 1 continues to run. With motor 1 running, air compressor 2 and hydraulic pump 3 continue to operate so that air pressure in reservoir 7 continues to build up while hydraulic fluid from pump 3 bypasses accumulator 21 via pipe 23 and valve 26.

Assuming the reverse situation, that is, air pressure in reservoir 7 attaining maximum pressure first, governor device 10 would effect opening of switch 13, but since switch 27 in this situation would remain closed, motor circuit 4 would remain closed to keep motor 1 and therefore compressor 2 and hydraulic pump 3 running. At the same time that governor device 10, however, effects opening of switch 13, unloader valve 12 is operated to its cut-off position, above noted, and thereby, in conventional manner, cause the compressor to divert compressed air output to atmosphere rather than to reservoir 7.

Assuming that both reservoir 7 and accumulator 21 attain respective states of maximum pressure, then operation of both switches 13 and 27 to their respective open positions is effected and motor circuit 4 is opened to shut down motor 1. Motor 1, and therefore compressor 2 and hydraulic pump 3, remain in a shut-down state until such time that the pressures in either reservoir 7 or accumulator 21, or both, drop to certain minimum degrees, respectively, at which governor device 10, valve device 26, and both switches 13 and 27 are pre-set to respond. If one or the other or both of switches 13 and 27 operates to a closed position, motor circuit 4 is closed and motor 1, along with compressor 2 and hydraulic pump 3 are set into operation again. Depending upon which portion of the system, pneumatic or hydraulic, or both, is demanding pressure build-up, either the unloader valve 12 is operated by governor 10 to a cut-in position, in which compressed air output of compressor 2 is diverted to storage reservoir 7, or valve 26 is operated to its closed position, or both are operated at the same time to their respective cut-in and closed positions to allow build up of pressure in both positions.

It should be apparent that in the system above described and embodying the invention, the use of a single motor for driving the air compressor 2 and hydraulic pump through a common shaft provides a more economical arrangement for supplying compressed air and hydraulic fluid for a combined compressed air-hydraulic fluid system.

Having now described the invention, what we claim as new and desire to secure by Letters Patent, is:

1. A combined compressed air and hydraulic fluid supply apparatus comprising:

a. a pneumatic portion including:

i. an air compressor, ii. a storage reservoir, iii. first conduit means via which compressed air is transmitted from said air compressor to said storage reservoir, iv. an unloader valve device operably mounted on said air compressor and having a cut-in position in which compressed air output from the air compressor is directed through said first conduit means to said storage reservoir, and being operable responsively to air pressure to a cut-out position in which said compressed air output is diverted from said first conduit means to atmosphere, v. second conduit means interconnecting said storage reservoir and said unloader valve device, vi. a governor device interposed in said second conduit means and operable responsively to compressed air in said storage reservoir at a certain maximum pressure to one position in which air pressure from the reservoir is communicated to said unloader valve device via said second conduit means for effecting operation thereof to its said cut-out position, said governor device being operable responsively to a reduction of air pressure in the storage reservoir to a certain minimum pressure to a different position in which said unloader valve is relieved of air pressure for effecting restoration thereof to its said cut-in position;

b. a hydraulic portion including:

i. a hydraulic fluid pump having an inlet and an outlet, ii. a hydraulic sump connected to said inlet, iii. a hydraulic accumulator for receiving hydraulic fluid from said hydraulic pump, iv. bypassing conduit means interconnecting said outlet with said sump in bypassing relation to said accumulator, and v. hydraulic pressure responsive regulator means interposed in said bypassing conduit means and being operable responsively to hydraulic fluid in said accumulator at a certain minimum pressure to a closed position in which communication between said outlet and said sump via said bypassing conduit means is interrupted, said regulator means being operable responsively to hydraulic fluid in said accumulator at a certain maximum pressure to an open position in which said communication is opened for diverting hydraulic fluid from the pump outlet to said sump via said bypassing conduit means;

c. common driving means comprising an electric motor for driving said compressor and said pump concurrently;

d. electrical circuitry effective when closed for actuating said motor and effective when opened for shutting down the motor;

e. first electrical switch means interposed in said circuitry and pneumatically connected to said governor device, said first electrical switch means being operable, in response to air pressure supplied thereto by said governor device concurrently with that supplied to the unloader valve device, to an open position for opening said circuitry, and operable in response to relief of air pressure therefrom by said governor device concurrently with relief of compressed air from the unloader valve device, to a closed position for closing said circuitry;

f. second electrical switch means interposed in said circuitry in parallel relation to said first electrical switch means and operable, in response to hydraulic pressure supplied to said regulator means at said minimum pressure, to a closed position for closing said circuitry, and operable, in response to hydraulic pressure supplied to said regulator means at said maximum pressure, to an open position for opening said circuitry.

* * * * *